J. A. STUBBLEFIELD.
SNAP.
APPLICATION FILED JAN. 14, 1909.
940,213.  Patented Nov. 16, 1909.
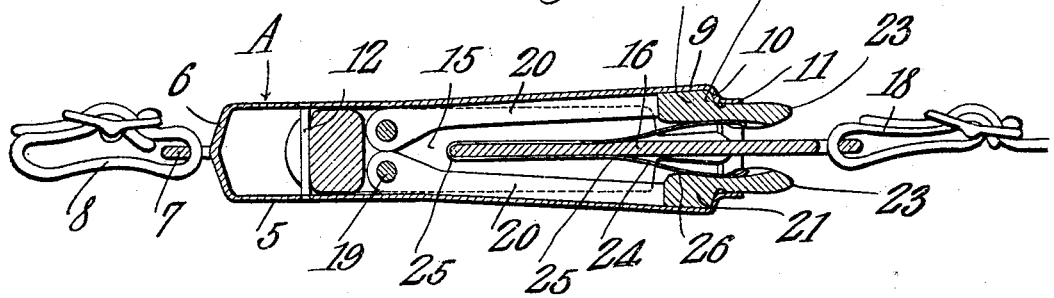
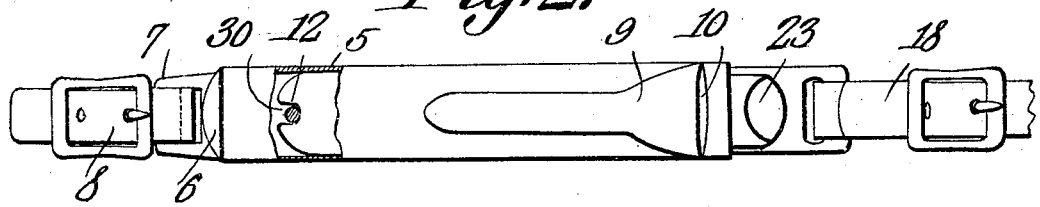
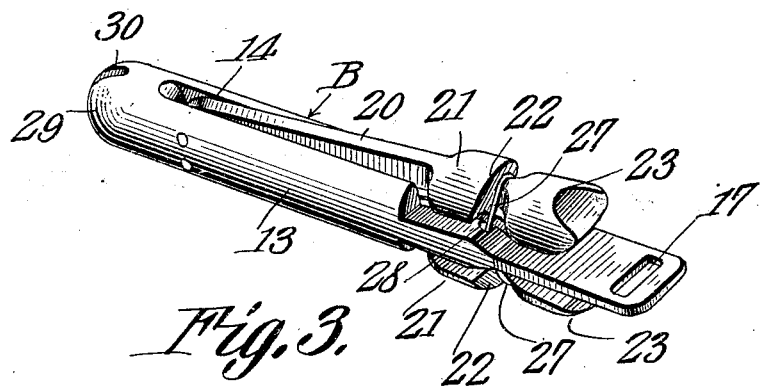
Witnesses
Inventor
John A. Stubblefield.
By C. A. Snow & Co.
Attorneys

UNITED STATES PATENT OFFICE.

JOHN A. STUBBLEFIELD, OF SALEM, OREGON.

SNAP.

940,213.

Specification of Letters Patent.   Patented Nov. 16, 1909.

Application filed January 14, 1909.  Serial No. 472,200.

*To all whom it may concern:*

Be it known that I, JOHN A. STUBBLEFIELD, a citizen of the United States, residing at Salem, in the county of Marion and State of Oregon, have invented a new and useful Snap, of which the following is a specification.

It is the object of the present invention to provide a novel form of snap connection for harness and the like and one particularly well adapted for use in connecting strap lengths and one of the novel features of the device resides in so constructing the two members of the same as to automatically cause their alinement upon their connection with each other so that the straps connected by the said device will be themselves alined.

A further feature of the invention resides in the provision of means for preventing rotation of one member with respect to the other and thereby preventing their accidental separation.

A further object of the invention is to so construct the device that it will be as compact as practical and may readily be manipulated for the purpose of connecting or disconnecting the straps or other elements associated therewith.

Another novel feature of the invention resides in the simplicity of the parts thereof and their arrangement so as to provide against injury while under strain incident to use.

In the accompanying drawings, Figure 1 is a vertical longitudinal sectional view through a snap connection constructed in accordance with the present invention, Fig. 2 is a plan view thereof, parts being shown in section, and Fig. 3 is a detail perspective view of the plug member of the said connection.

As shown in the drawings, the snap connection embodying the invention consists of two members, one, indicated by the reference character A, being the socket member of the device, and the other, indicated in general by the reference character B, being the plug member of the device.

The socket member of the device is in the form of a substantially cylindrical sleeve 5 closed at one end as indicated by the numeral 6 and formed at its said end with a loop 7 with which may be connected a strap or other connection or element intended to be connected with another element through the medium of the device, the strap being indicated by the numeral 8. For the engagement of locking elements, as will be presently described, the said sleeve 5 is formed with diametrically oppositely located seats 9, preferably formed by stamping up the metal of the sleeve, although they may be otherwise formed, and these seats result in shoulders 10 adjacent the open end 11 of the sleeve 5 for the engagement of the shoulders of the locking elements of the plug member B of the device. For a purpose also to be presently described, the sleeve is provided with a pin 12 which extends transversely thereacross adjacent its closed end 6.

The plug member of the device is comprised of a cylindrical body 13 provided with a slot 14 which opens through the body from side to side as at 15 and the said body is formed with a web 16 which extends axially thereof and divides the slot for the greater portion of its length. This web 16 extends beyond one end of the body 13 as is clearly shown in Fig. 3 of the drawings, and is provided at its extremity, with a slot 17 for the passage of a strap or other connection 18 which is to be joined with the connection or strap 8 through the medium of the device embodying the invention.

Pivoted in the slot 14, as at 19 is a pair of locking elements including stems 20 and heads 21, the said heads having abrupt or shouldered ends 22 which are adapted to engage with the shoulders 10 of the seats 9 of the socket member of the device when the plug member is inserted thereinto. Beyond the shouldered end 22 of the head 21, the locking elements are provided each with a flat finger piece 23 and from an inspection of Fig. 1 of the drawings it will be seen that these two elements are adapted for movement, on their pivots, toward and from each other, and that upon movement from each other, or in other words upon separation, they will tend to seat in the seats 9 formed in the socket member for this purpose. In order that the elements may be automatically compelled to seat in the seats 9 of the socket member, a flat leaf spring 24 bent at a point midway of its ends, upon itself, as at 25, is fitted upon the web 16 with its bend receiving the inner end of the said web, the spaced portions of the spring being sprung apart and away from the said web as indicated by the numeral 26 and seating at their extremities against the opposed or inner faces or sides of the heads 21 and corresponding finger pieces 23, it being understood that this spring tends to force both of the elements in a direction to engage in the seats 9 upon insertion of the plug member into the socket member of the device, or in other words, tends normally to separate the said elements. This separation of the elements is had, only to a limited degree inasmuch as a ring 27 is engaged upon the members substantially at the points of junction of their finger pieces 23 with the shouldered ends of their heads 21, the ring passing through openings 28 formed in the web 16. It will be understood from the foregoing description of the invention that upon insertion of the plug member of the device into the socket member thereof, the locking elements 20 will automatically spring with their heads 21 engaging in the seats 9 formed in the said socket member, and that the abrupt or shouldered ends 22 of the said head will engage with the shoulders 10 of the said seats so as to effectually prevent accidental withdrawal of the plug member from the socket member. It will be observed from an inspection of Fig. 1 of the drawings that the web 16 of the plug member projects at its outer end beyond the extremities of the finger pieces 23 of the locking element 20, and it will further be understood, in connection with the foregoing description, that upon pressing both of the finger pieces 23 in the direction of the said web, the shouldered ends of their heads 21 will be caused to disengage from the shouldered ends of the seats, and that removal of the plug may then be accomplished.

As will be understood from an inspection of the drawings, and as heretofore stated, the seats 9 are formed by stamping out the walls of the sleeve 5 comprising the body of the socket member A of the device, and these seats are oppositely located, so that in order for the plug member to have its locking element engaged with the seats, the said plug element must be in proper alinement with the socket member when inserted thereinto, and it is desirable that some means be provided for automatically accomplishing this alinement of the two members so that repeated endeavors to bring the members to proper alinement will not be rendered necessary. The means just mentioned is embodied, in part, in the transverse pin 12 of the socket member, which pin has heretofore been referred to, and the inner end of the plug body 13 is rounded or convexed as indicated by the numeral 29 and is formed with a slot or notch 30 extending, as shown in the drawings, in the same plane as the slot 14 in the said body of the plug member. Now, should the plug member be inserted into the socket member in a position other than in proper alinement therewith, the convex end of the body 13 of the plug member of the device will engage with the transverse pin 12 and further pressure in a direction to insert the plug in the socket will result in the edges of the slot 30 in the end of the said body 13 riding over the pin, causing partial rotation of the plug member as an entirety and a final seating of the pin in the slot 30 and, simultaneously, an automatic engagement of the locking elements in the seats 9 of the socket member.

From the foregoing description of the invention it will be seen that there is provided an extremely simple snap connection of this class for the purpose described and that the device may be quickly manipulated to connect or disconnect the strap lengths or other elements. Further, it will be understood that means is provided for automatically alining the two members of the device whereby they may be connected with a single movement instead of repeated trials at securing the proper alinement being necessary.

What is claimed is:—

1. A device of the class described comprising a socket member and a plug member removably fitted in the socket member and having means thereon for automatically locking it in the socket member when inserted therein, and a transverse pin in the socket member, the plug member having a rounded end formed with a notch to receive said pin whereby the plug member may be held in alinement with the socket member.

2. A device of the class described comprising a socket member, shoulders upon the said members, and a plug member removably fitted into the socket member and having means thereon to engage with the shoulders upon the socket member for automatically locking the plug member within the socket member when inserted therein, and a transverse pin carried by the socket member, the end of the plug member being rounded and formed with a slot, the edges of the slot at the said rounded end being adapted to ride over the pin upon insertion of the plug member into the socket member whereby, upon such insertion, the plug member will be alined with the socket member.

3. A device of the class described comprising a socket member and a plug member fitted removably into the socket member, the said plug member comprising a body, locking elements pivoted upon the body and movable toward and from each other, the said body being formed with a web extending between the locking elements, a spring fitted upon the web and having its end portions engaging with the locking element and tending normally to separate the same, the said web portion of the body of the plug projecting beyond one end of the said socket member and being adapted for the connection of a strap or the like.

In testimony that I claim the foregoing as my own, I have hereto affixed my signature in the presence of two witnesses.

JOHN A. STUBBLEFIELD.

Witnesses:
    F. E. NEWBERRY,
    C. L. MCNARY.